April 5, 1949.  L. W. STINNE  2,466,284
CLOTHESPIN AND CLAMP
Filed Aug. 21, 1945
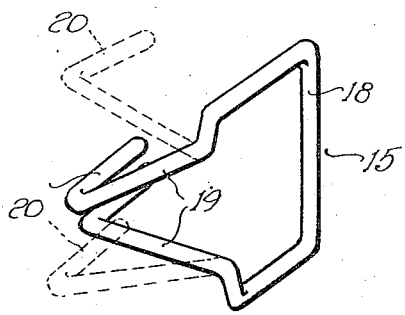
FIG. 2.
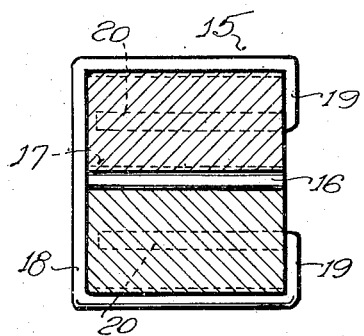
FIG. 3.
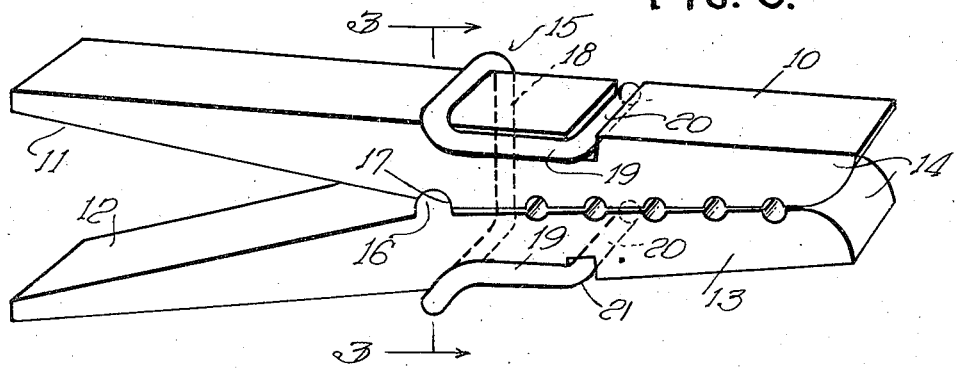
FIG. 1.
LESLIE W. STINNE
INVENTOR.
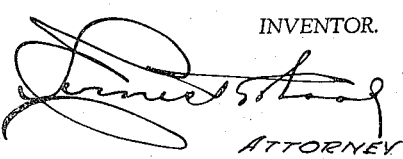
ATTORNEY

Patented Apr. 5, 1949

2,466,284

UNITED STATES PATENT OFFICE 2,466,284

CLOTHESPIN AND CLAMP

Leslie W. Stinne, Dallas, Tex.

Application August 21, 1945, Serial No. 611,735

2 Claims. (Cl. 24—137)

This invention relates to clothespins and clamps and more particularly to clothespins consisting of complementary members held in clamping position by a spring.

The principal object of the invention is to improve upon the old and well known clothes clamp or pin of the spring jaw type through a novel construction which prevents springing apart of the clamp members when subjected to accidental lateral pressures in opposite directions, which often occurs in normal use. The present invention not only seeks to obviate this objectionable and annoying characteristic but also to afford greater economy of manufacture and to produce a clamp which operates with greater smoothness and in which the tensioning means of the clamp cannot come into contact with the article engaged by the clamp.

With the foregoing objects as paramount, the invention has further reference to certain features of accomplishment which will become apparent as the description proceeds, taken in connection with the accompanying drawings wherein:

Figure 1 is a perspective view of a clothespin or clamp constructed according to the present invention.

Figure 2 is a detail perspective view of the spring clip adapted to hold the parts together for springing action, showing in solid lines the relaxed position and in broken lines, the extended position thereof, and Figure 3 is a view in vertical section, taken on line 3—3 on Figure 1, but drawn to a larger scale.

Continuing with a more detailed description of the drawing, reference numeral 10 denotes a clamp member whose tail portion 11 is deflected on its underside to correspond with that of the tail portion 12 of a companion clamp member 13, so that when the said tail portions are brought together, the opposie ends 14 move apart to engage an object to be clamped when said tail portions are released to the action of a spring 15.

The spring 15 may be of any suitable material having highly resilient qualities and the present invention resides in the peculiar construction and function of this spring. Primarily, the two jaws or clamp members 10 and 13 are held against lateral displacement by means of a tongue 16 formed transversely across the member 13 at its mid-section which rockingly lies in a groove 17 at a corresponding point in the confronting face of the companion member 10, the tongue 16 and the groove 17 constituting the fulcrum point for the coacting members 10 and 13.

The spring member or clip 15 consists of a length of steel wire or other resilient material, bent to form a partial loop 18, having extensions or arms 19 bent into a plane at right angles to that of the loop to lie alongside each of the clamp members 10 and 13 towards the forward or clamping end of the device. The extremities 20 of the arms 19 are bent abruptly inwardly at right angles to the arms 19 to lie in grooves 21 and 21a made in the outer faces of the members 10 and 13. When the spring clip 15 is removed from the clamp members and relaxed, it assumes the form shown in Figure 2, with the arms 19 in contiguous relationship. Thus, when in position on the members 10 and 13, the arms 19 are under continuous tension, which increases when the tail portions of the members are brought together.

It is apparent from the foregoing that the clamp members are held positively against other than relative rocking motion which is smooth uniform. Moreover, the tension member, being at all times out of engagement with the article clamped, will not catch upon the article or soil the same if the latter happens to be the fabric of a garment.

Manifestly, the construction as shown and described is capable of some modification and such modification as may be construed to fall within the scope and meaning of the appended claims is also considered to be within the spirit and intent of the invention.

What is claimed is:

1. As a new article of manufacture, a clamp comprising complementary clamping members fulcrumed for relative rocking displacement at their midsection and held against relative displacement, a spring element partially embracing and binding said members together at their fulcrum, said spring element having arms extending along the sides of said clamping members in a forwardly direction and whose extremities lie at right angles thereto in grooves formed transversely in the outer face of said members, to impose a constant force on and tending to close said clamping members.

2. As a new article of manufacture, a clamp comprising complementary clamping members held against other than rocking displacement and a tension member partially embracing the midsection of said members to bind the same in assembly and having an arm lying alongside each of said clamp members whose extremities lie at right angles to said arms in transverse grooves in the outer faces of the operative ends of said members to impose a compressive force thereon.

LESLIE W. STINNE.

REFERENCES CITED

The following references are of record in the file of this patent:

UNITED STATES PATENTS

| Number | Name | Date |
|---|---|---|
| 495,518 | Russell | Apr. 18, 1883 |
| 867,489 | Faulkingham | Oct. 1, 1907 |

FOREIGN PATENTS

| Number | Country | Date |
|---|---|---|
| 18,955 | France | May 27, 1914 |